US010216504B2

(12) United States Patent
Allgeier et al.

(10) Patent No.: US 10,216,504 B2
(45) Date of Patent: Feb. 26, 2019

(54) SYSTEM AND METHOD FOR INSULATING A WEB USER INTERFACE APPLICATION FROM UNDERLYING TECHNOLOGIES IN AN INTEGRATION CLOUD SERVICE

(71) Applicant: Oracle International Corporation, Redwood Shores, CA (US)

(72) Inventors: Axel Allgeier, Denver, CO (US); Muthu Palanisamy, Tamil Nadu (IN); Kishore Gollapalli, Hyderabad (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 118 days.

(21) Appl. No.: 15/171,908

(22) Filed: Jun. 2, 2016

(65) Prior Publication Data

US 2016/0357540 A1     Dec. 8, 2016

Related U.S. Application Data

(60) Provisional application No. 62/171,785, filed on Jun. 5, 2015.

(51) Int. Cl.
*G06F 8/61* (2018.01)
*G06F 9/54* (2006.01)
*H04L 29/08* (2006.01)

(52) U.S. Cl.
CPC .................. *G06F 8/61* (2013.01); *G06F 9/54* (2013.01); *G06F 9/541* (2013.01); *H04L 67/34* (2013.01)

(58) Field of Classification Search
CPC ... G06F 8/61; G06F 9/54; G06F 9/541; H04L 67/34

USPC ......................................... 717/136, 137, 177
See application file for complete search history.

(56) References Cited

U.S. PATENT DOCUMENTS

| 6,981,263 | B1 * | 12/2005 | Zhang | G06O 50/188 |
| | | | | 709/217 |
| 7,509,248 | B2 * | 3/2009 | Fernandez | G06F 9/4493 |
| | | | | 703/27 |
| 7,565,443 | B2 * | 7/2009 | Rossmanith | G06F 9/546 |
| | | | | 709/202 |

(Continued)

OTHER PUBLICATIONS

Oracle®, Oracle® BPEL Process Manager Installation Guide 10g Release 2 (10.1.2) for Solaris Operating Environment (SPARC), Linux x86, and Microsoft Windows, "1 Overview of Oracle BPEL Process Manager", 7 pages, retrieved on Nov. 3, 2014.

*Primary Examiner* — Andrew M. Lyons
(74) *Attorney, Agent, or Firm* — Tucker Ellis LLP

(57) ABSTRACT

In accordance with an embodiment, described herein is a system and method for providing an abstraction layer that insulates a web interface application from underlying technologies. The abstraction layer includes an application programming interface that exposes a plurality of services to the web interface application, for use in the entire life cycle of an integration project. The web interface application is agnostic of the underlying frameworks that persist the integration project, and the runtime engines that are to execute the integration project. The application programming interface can persist the integration project in a runtime-engine-neutral format, and can transform the integration project from the runtime-engine-neutral format to a runtime-engine-specific format at deployment time.

20 Claims, 6 Drawing Sheets

(56) References Cited

U.S. PATENT DOCUMENTS

| | | | | |
|---|---|---|---|---|
| 7,574,511 B2* | 8/2009 | Pujol | G06F 9/46 | 707/999.01 |
| 8,533,799 B2* | 9/2013 | Ye | H04L 41/5054 | 709/238 |
| 8,949,292 B2* | 2/2015 | Chao | G06F 17/5009 | 703/13 |
| 9,319,469 B2* | 4/2016 | Ruhlen | H04L 67/16 | |
| 2002/0169842 A1* | 11/2002 | Christensen | G06Q 40/02 | 709/206 |
| 2005/0223392 A1* | 10/2005 | Cox | G06Q 10/06 | 719/328 |
| 2008/0320019 A1* | 12/2008 | Bireley | G06F 17/30315 | |
| 2008/0320401 A1* | 12/2008 | B | G06F 17/2247 | 715/762 |
| 2009/0138891 A1* | 5/2009 | Winig | G06F 9/541 | 719/313 |
| 2009/0222360 A1* | 9/2009 | Schmitt | G06Q 10/0875 | 705/29 |
| 2010/0131916 A1* | 5/2010 | Prigge | G06F 8/10 | 717/104 |
| 2013/0031566 A1* | 1/2013 | Sureshan | G06Q 10/0633 | 719/313 |
| 2013/0117733 A1* | 5/2013 | Ahmed | G06F 8/30 | 717/140 |
| 2014/0344211 A1* | 11/2014 | Allan | G06F 8/433 | 707/602 |
| 2014/0372428 A1* | 12/2014 | Mathis | G06F 17/30569 | 707/736 |
| 2016/0034276 A1* | 2/2016 | Webb | G06F 8/76 | 726/2 |
| 2016/0232042 A1* | 8/2016 | Ritter | G06F 8/20 | |
| 2016/0321043 A1* | 11/2016 | Pavlin | G06F 8/36 | |
| 2017/0052970 A1* | 2/2017 | Crabtree | G06F 17/30563 | |

\* cited by examiner

SYSTEM AND METHOD FOR INSULATING A WEB USER INTERFACE APPLICATION FROM UNDERLYING TECHNOLOGIES IN AN INTEGRATION CLOUD SERVICE

CLAIM OF PRIORITY

This application claims the benefit of priority to U.S. Provisional Application titled "SYSTEM AND METHOD FOR INSULATING A WEB UI APPLICATION FROM UNDERLYING TECHNOLOGIES IN AN INTEGRATION FLOW DESIGN TIME ENVIRONMENT", Application Ser. No. 62/171,785, filed Jun. 5, 2015, which is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to cloud services, and are particularly related to a system and method for insulating a web interface application from underlying technologies in a cloud-based integration service.

BACKGROUND

The rapid shift from on-premises applications to a hybrid mix of Software-as-a-Service (SaaS) and on-premises applications has introduced challenges for companies attempting to integrate enterprise applications. Integration platform as a service (iPaaS) can provide a set of cloud-based tools to address these challenges. An iPaaS platform can provide a design time for developers to design, deploy and monitor integration projects. However, these integration projects can be tied to particular runtime engine, and cannot be deployed to a different runtime engine without additional work.

SUMMARY

In accordance with an embodiment, described herein is a system and method for providing an abstraction layer that insulates a web interface application from underlying technologies in a cloud-based integration service. The abstraction layer can include an application programming interface that exposes a plurality of services to the web interface application, for use in the entire life cycle of an integration project. The web interface application is agnostic of the underlying frameworks that persist the integration project, and the runtime engines that are to execute the integration project. The application programming interface can persist the integration project in a runtime-engine-neutral format, and can transform the integration project from the runtime-engine-neutral format to a runtime-engine-specific format at deployment time.

DETAILED DESCRIPTION

Integration platform as a service, for example, Oracle Integration Cloud Service (ICS), can provide a cloud-based platform for building and deploying integrations flows that connect applications residing in the cloud or on-premises.

Figure 1:
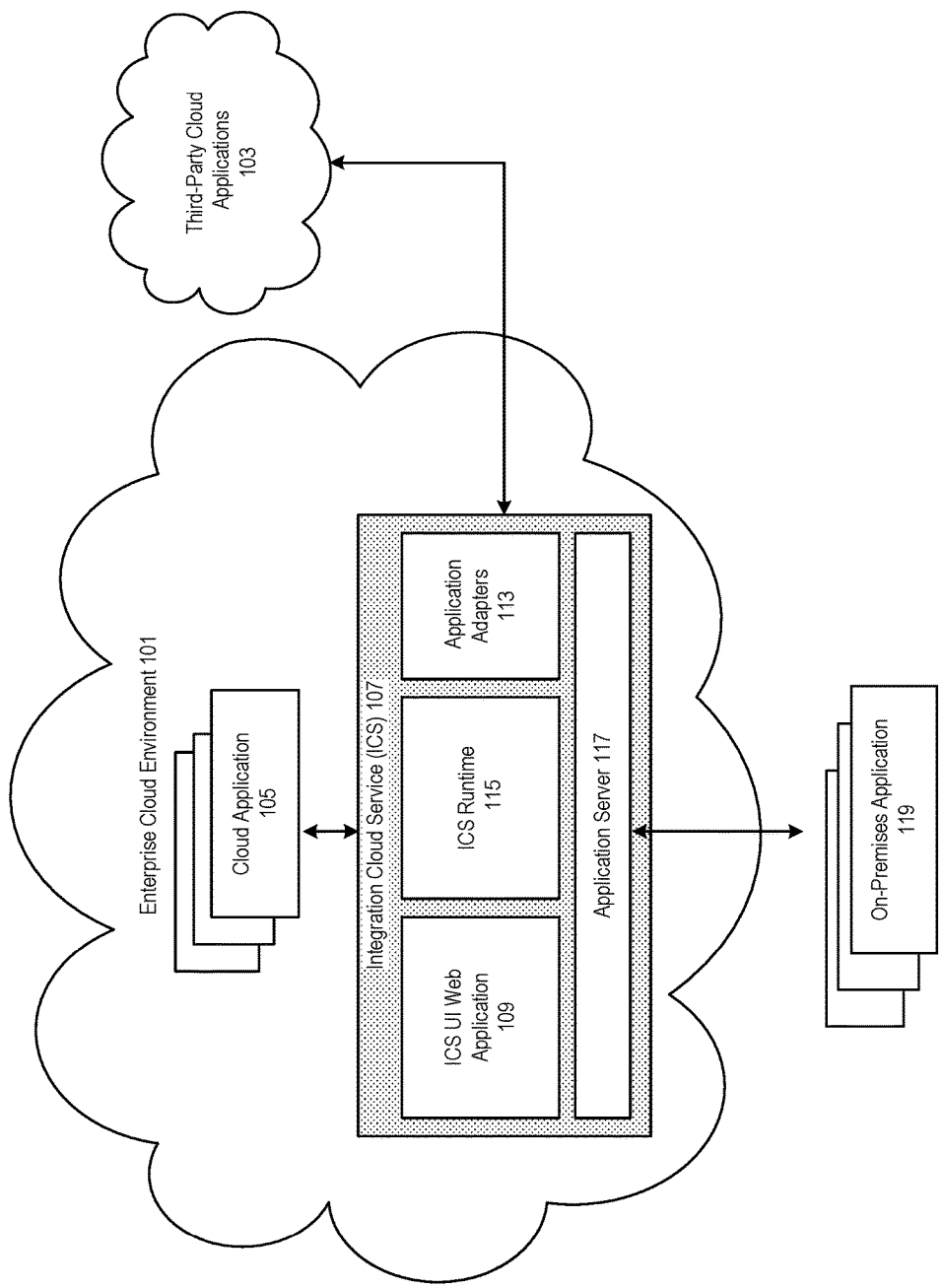
FIG. 1 illustrates an integration cloud service in accordance with an embodiment.

FIG. 1 illustrates an integration cloud service in accordance with an embodiment.

As shown in FIG. 1, an ICS 107 can provide a cloud-based integration platform for designing, executing, and managing ICS integration flows. The ICS can include a web application 109 and an ICS runtime 115 executing on an application server 117 in an enterprise cloud environment (for example, Oracle Public Cloud) 101. The web application can provide a design time that exposes a plurality of user interfaces for a developer to design, activate, manage, and monitor an ICS integration flow. An activated ICS integration flow can be deployed and executed on the ICS runtime.

In accordance with an embodiment, a plurality of application adapters 113 can be provided to simplify the task of configuring connections to a plurality of applications, by handling the underlying complexities of connecting to those applications. The applications can include enterprise cloud applications of the ICS vendor (for example, an Oracle RightNow) 105, third-party cloud applications (for example, Salesforce) 103, and on-premises applications 119. The ICS can expose simple object access protocol (SOAP) and representational state transfer (REST) endpoints to these applications for use in communicating with these applications.

In accordance with an embodiment, an ICS integration flow (or ICS integration) can include a source connection, a target connection, and field mappings between the two connections. Each connection can be based on an application adapter, and can include additional information required by the application adapter to communicate with a specific instance of an application.

In accordance with an embodiment, an ICS integration flow can be defined in an ICS project, which can include a structured set of artifacts, for example, metada, Java Connector Architecture (JCA) files and web service definition language (WSDL) files. An ICS project can be deployed and executed in the ICS runtime, and can be used to integrate cloud applications and on-premises applications. As such, an ICS project is an integration project. Throughout the document, the terms "ICS project" and "ICS integration project" are used interchangeably. Both terms can be used to refer to an integration project.

Abstraction Layer

As described above, an ICS can include a web UI application for ICS developers to design ICS projects, and a runtime for executing the projects.

During the life cycle of an ICS project, a developer often needs to use a plurality of interfaces. For example, during the development phase, the developer can perform CRUD (create, read, update, and delete) operations on the project. During the deployment phase, the developer can compile and deploy the project. These operations can be performed in different interfaces. In addition, an ICS project can be developed in a format specific to a particular runtime engine, and cannot be reused for a different runtime engine without additional work.

In accordance with an embodiment, the system can provide an abstraction layer that insulates a web interface application from underlying technologies. The abstraction layer includes an application programming interface that exposes a plurality of services to the web interface application, for use in the entire life cycle of an integration project. The web interface application is agnostic of the underlying frameworks that persist the integration project, and the runtime engines that are to execute the integration project. The application programming interface can persist the integration project in a runtime-engine-neutral format, and can transform the integration project from the runtime-engine-neutral format to a runtime-engine-specific format at deployment time.

In accordance with an embodiment, the abstraction layer can reside between the web interface application, and one or more runtime engines in the ICS runtime, thereby insulating the ICS web interface layer from the underlying integration technology.

In accordance with an embodiment, a plurality of handlers can be provided, each for a particular runtime engine. A handler specific to a runtime engine can be used to transform an ICS project from a runtime-engine-neutral format to a format specific to the runtime engine.

Additionally, the abstraction layer can be used to generate and validate ICS packages, export and import an ICS project, bootstrap the persistence store with pre-defined ICS project and data, and move ICS data between ICS project instances.

Figure 2:
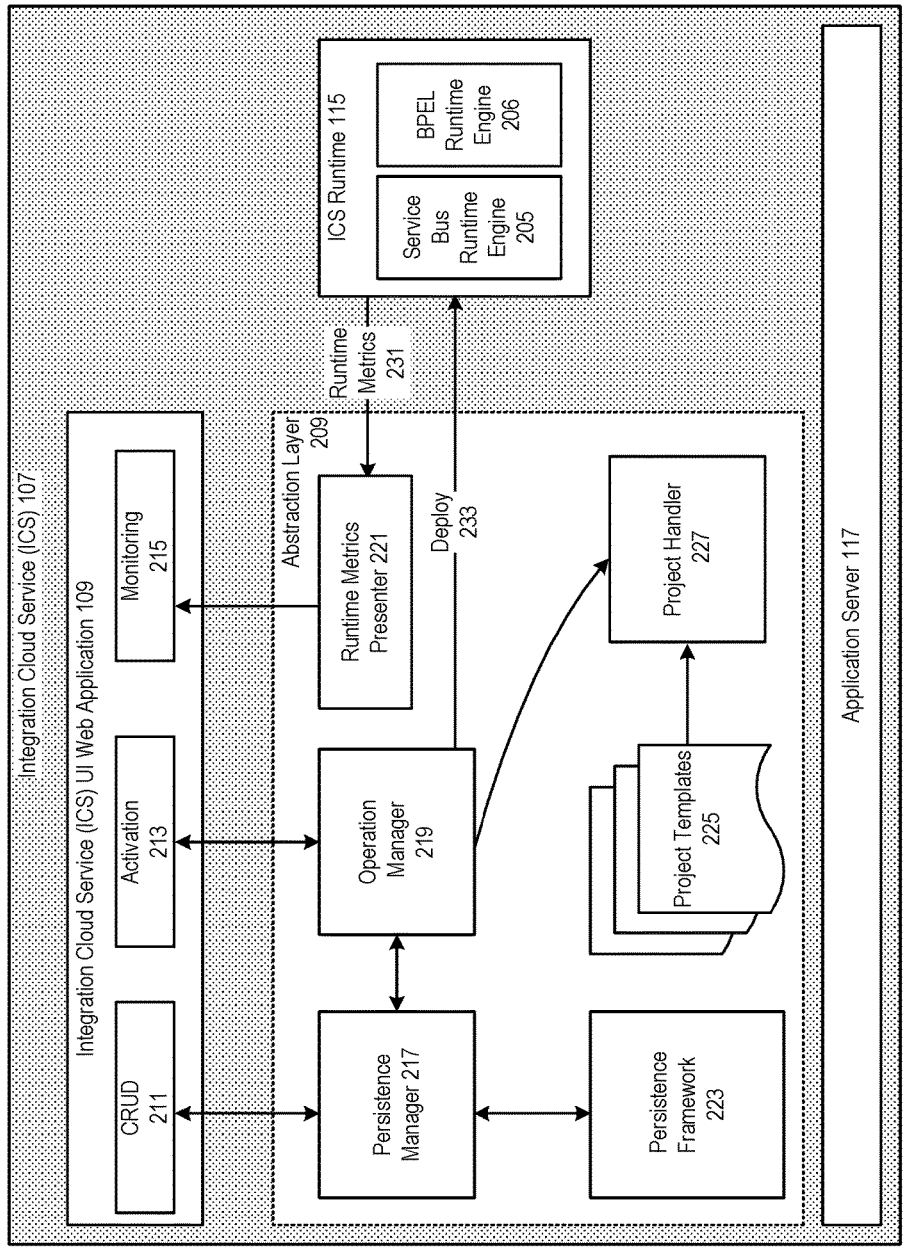
FIG. 2 illustrates a system for insulating a UI application from runtime engines in an ICS runtime, in accordance with an embodiment.

FIG. 2 illustrates a system for insulating a UI application from runtime engines in an ICS runtime, in accordance with an embodiment.

As shown in FIG. 2, an abstraction layer 209 can include an API that exposes a plurality of functionalities to the web UI application for use in managing the life cycle of an ICS project. Each of the functionalities, for example, CRUD (create, read, update and delete) 211, activation 213, and monitoring 215, can be visible on a single interface in the web UI application.

In accordance with an embodiment, the abstraction API can provide a plurality of services using a plurality of classes/objects, for example, a persistence manager 217 and an operation manager 219, to insulate these functionalities from the underlying technologies (for example, persistence frameworks and runtime engines), which can provide flexibility and code reuse when the underlying technologies change.

In accordance with an embodiment, during the development phase of an ICS project, the developer can create a plurality of ICS objects (for example, connection objects, and integration flow objects). These objects need to read, updated or deleted. A plurality of persistence frameworks 223 can be plugged into the abstraction layer, and can be used by the operation manager, to perform the CRUD operations without the knowledge of the web UI application. The operation manager provides a set of interfaces that can insulate the exposed functionalities from the persistence framework configured to perform the functionalities.

As further shown, the abstraction layer can further include a plurality of project templates (for example, OSB templates), and a project handler 227 that can automatically select a runtime-engine-specific handler (for example, OSB handler), based on a user's selection of a particular runtime to host the ICS project. The selected runtime-engine-specific handler can convert the runtime-engine-neutral project retrieved by the operation manger from a persistence store, to a runtime-engine-specific project using one or more project templates 225. The operation manager can deploy 233 the runtime-engine-specific project to a particular runtime engine. By developing an ICS project in a runtime-engine-neutral format and converting it into a runtime-engine-specific format at deployment, the abstraction layer effectively insulates the web UI application from the runtime engines.

In accordance with an embodiment, the abstraction API further includes a runtime metrics presenter 221, to format and display runtime metrics 231 collected by APIs exposed by the ICS runtime. For example, the runtime metrics can include numbers of transactions and failed transactions per second for a given ICS integration flow, logging information for each successful invocation, activity stream showing, e.g., during the last 20 records. The exposed API by the ICS runtime can also be used to download transaction log files, and to retrieve user-specified requests for a particular type of runtime metrics.

Figure 3:
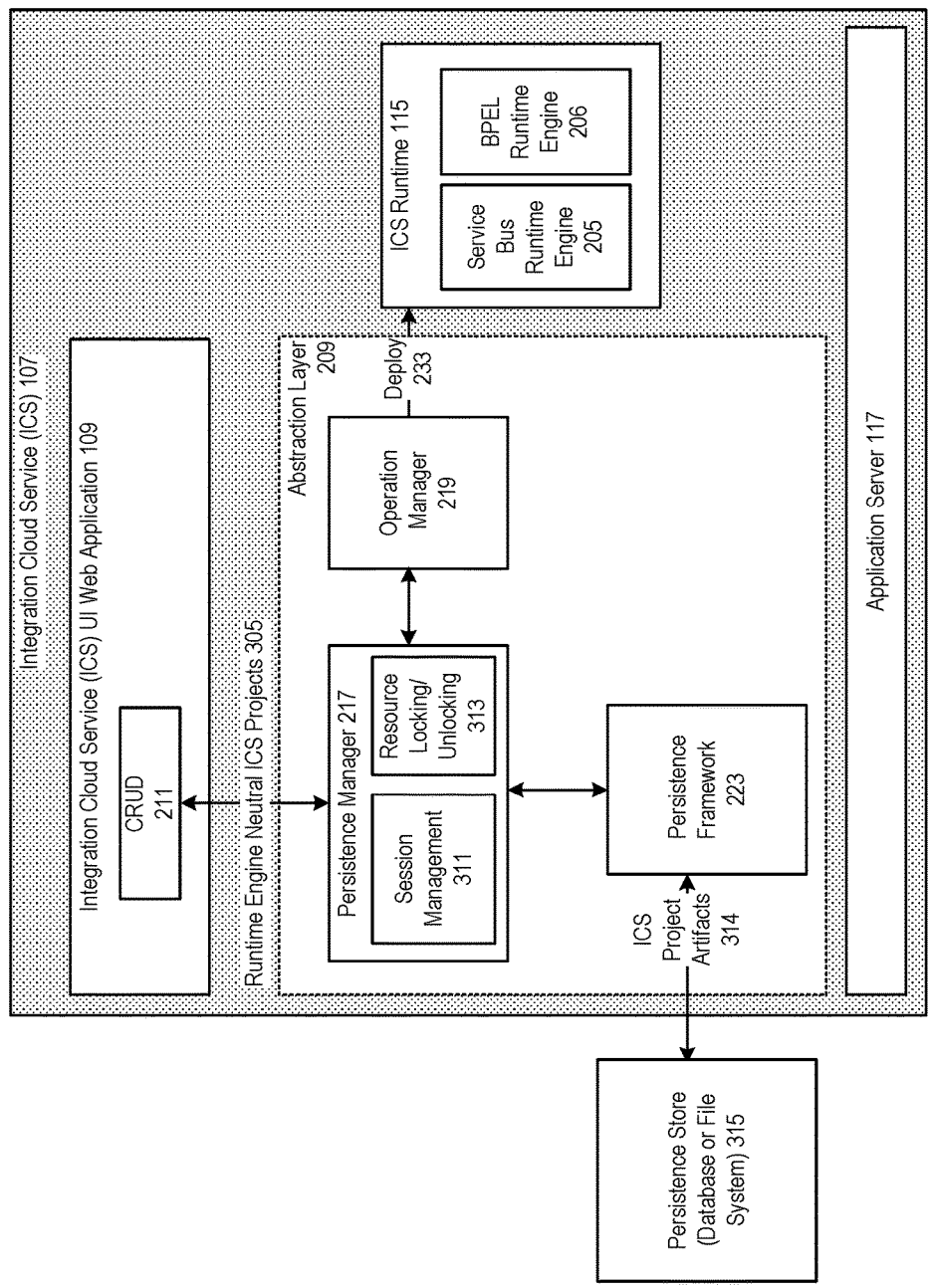
FIG. 3 further illustrates a system for insulating a web UI application from runtime engines in an ICS runtime, in accordance with an embodiment.

FIG. 3 illustrates a system for insulating a web UI application from runtime engines in an ICS runtime, in accordance with an embodiment.

As illustrated in FIG. 3, the web UI application can provide an interface for an ICS developer to create ICS projects 305, which can be persisted into a persistence store 315 using the pluggable persistence framework in a runtime-engine-neutral format.

In accordance with an embodiment, a runtime-engine-neutral ICS project can represent a project structure that is not specific to a particular runtime/integration engine, and can be defined by the web UI application. A runtime-engine-neutral project can include metadata defined in an XML format that represents configuration such as source applications, target applications, integration patterns, and schemas.

In accordance with an embodiment, an ICS project class can represent a runtime-engine-neutral format project, and can encapsulate the required metadata. An instance of the ICS project class (ICS project artifacts 314) can be stored to the persistence store.

In accordance with an embodiment, the persistence manager can perform session management 311 and resource locking/unlocking 313 while an ICS project is being developed. The persistence manager can keep tract of the status of each resource (e.g., files and metadata), and prevent a developer from unlocking a resource that another developer locks.

In accordance with an embodiment, different persistence frameworks, for example, OSB configuration framework, and Oracle Enterprise Repository (OER), can be plugged into the persistence manager, thereby insulating the web UI application from the persistence frameworks.

Figure 4:
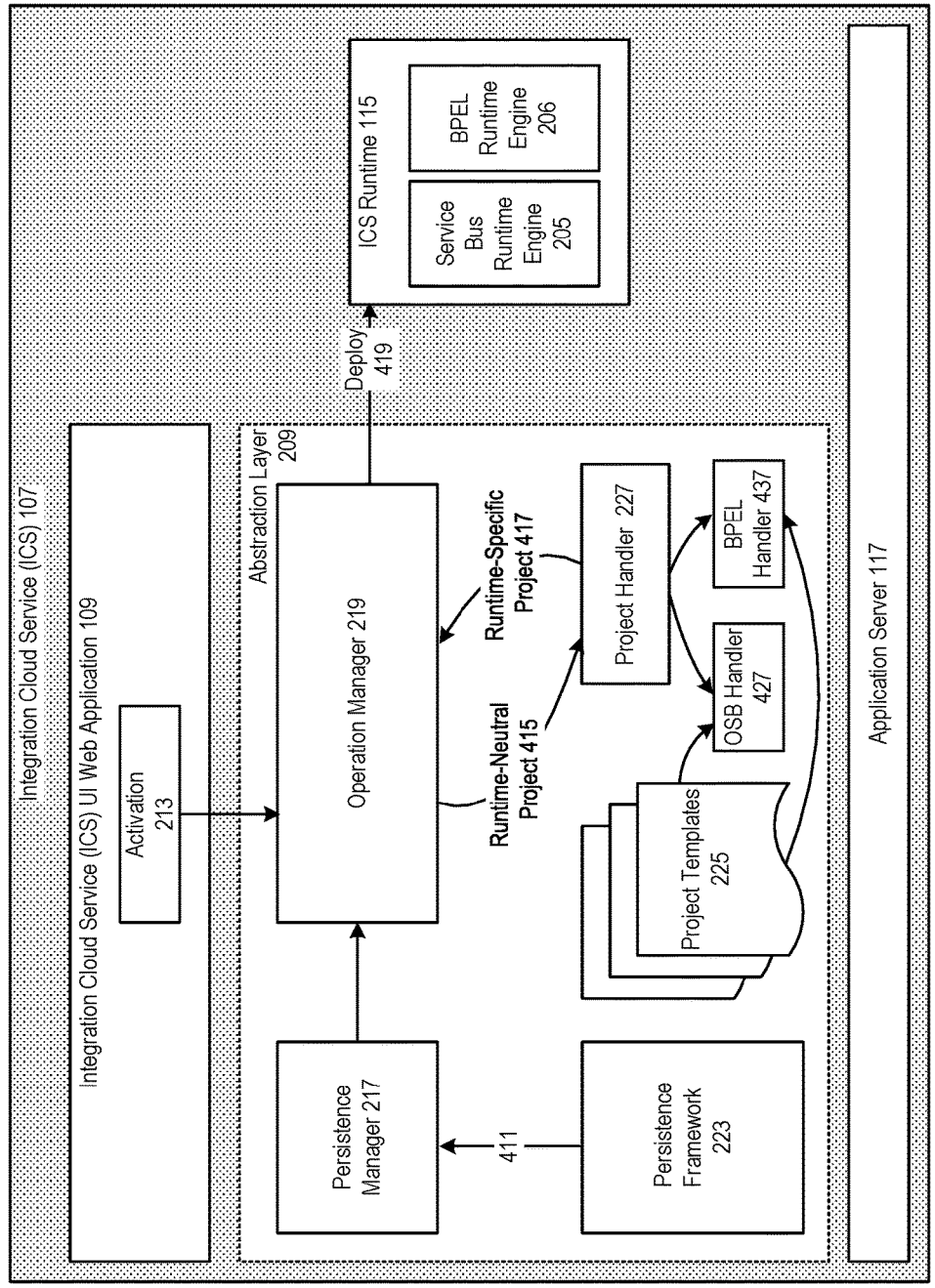
FIG. 4 further illustrates a system for insulating a web UI application from runtime engines in an ICS runtime, in accordance with an embodiment.

FIG. 4 further illustrates a system for insulating a web UI application from runtime engines in an ICS runtime, in accordance with an embodiment.

In accordance with an embodiment, the operation manager can be used to activate an ICS project.

Without the abstraction layer, an ICS project needs to be activated by explicitly performing a "build" action to generate an enterprise archive (EAR) file from the ICS project, selecting the EAR file from a web interface to deploy it, and using a third interface to monitor the deployed project. The abstraction layer can combine the EAR file generation, and deployment and monitoring of the ICS project into a single step in a particular interface.

In accordance with an embodiment, the Activation button can be placed beside an ICS project name. When the button is clicked, an ICS developer can be prompted to select a particular runtime to deploy the ICS project. In response to the selection, the operation manager can retrieve 411 the runtime-engine-neutral project from the persistence store using the persistence manager, transform the ICS project into a runtime-engine-specific format, generate an EAR file, and invoke APIs exposed by the specific runtime engine, for example Oracle Service Bus runtime engine (OSB), to deploy the EAR file thereon.

In accordance with an embodiment, the operation manager can invoke the project handler, which can select a runtime-engine-specific handler to transform the project, based on the runtime selected by the ICS developer.

As shown in FIG. 4, in accordance with an embodiment, the persistence manager can pass a runtime-engine-neutral project 415 to the project handler, which can return a runtime-engine-specific project to the operation manager. The project manager can deploy 419 the transformed project to a specific runtime engine to execute the project.

In accordance with an embodiment, a plurality of runtime-engine-specific handlers can be provided by the abstraction layer, for example, an Oracle Service Bus (OSB) handler 427, and a business execution process language (BPEL) handler 447. When the OSB handler is selected, the OSB handler can retrieve OSB templates from, e.g., a database, and use the templates and associated metadata to add specifics needed for the ICS project to run on an OSB runtime engine. A plurality of methods can be used to transform the ICS project using the retrieved templates and metadata.

In accordance with an embodiment, after the project is deployed, monitoring of the deployed project can be performed through the same user interface where the activation button described above is located.

In accordance with an embodiment, the ICS runtime can expose a set of APIs used to display runtime metrics, such as number of transactions and failed transactions per second for a given ICS integration flow, logging information for each successful invocation, activity stream showing, e.g., the last 20 records. The exposed API can also be used to download log files for all the transactions, and to receive user-specified requests for a particular type of runtime metrics.

Figure 5:
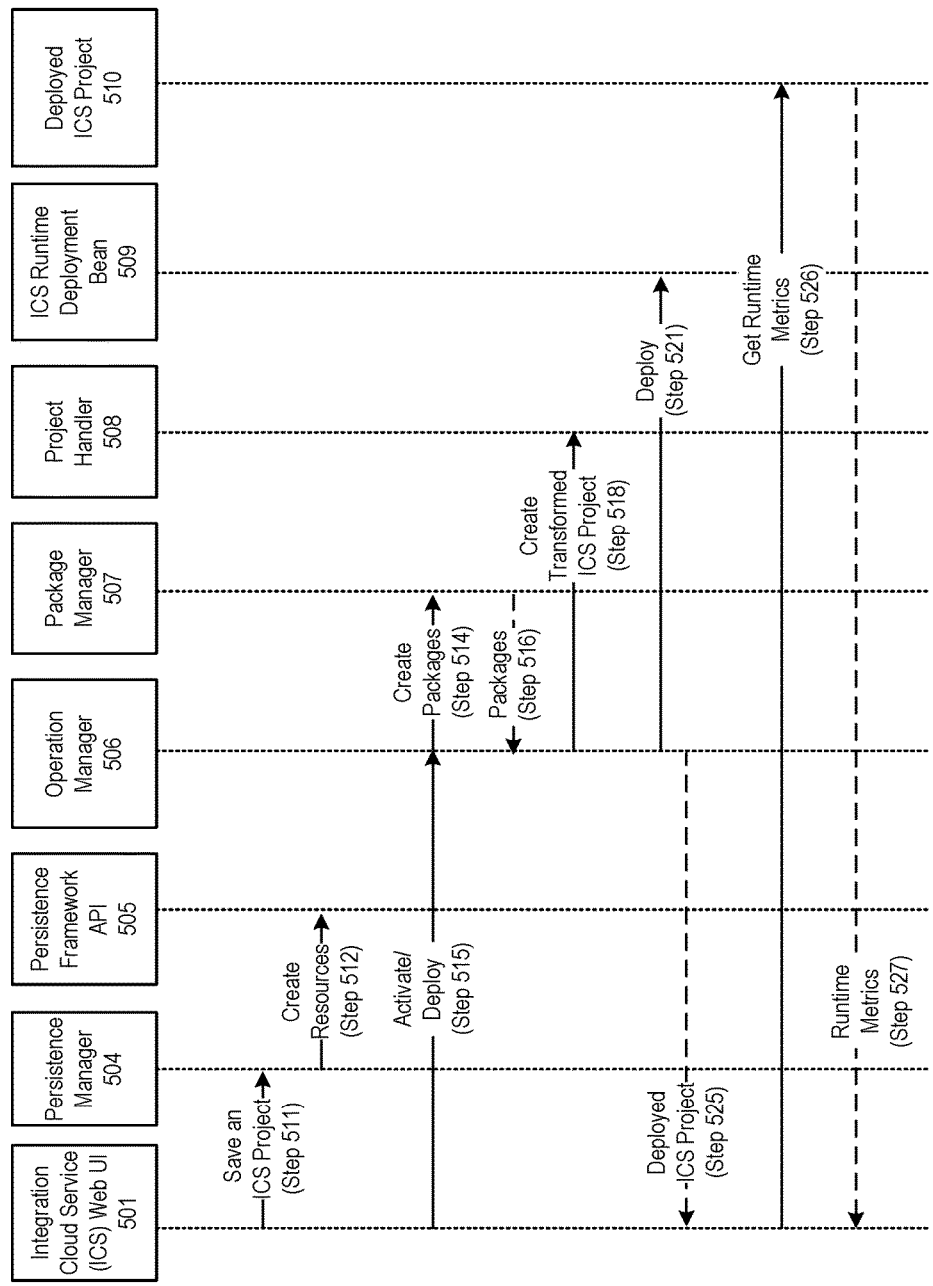
FIG. 5 illustrates a sequence diagram for insulating a web UI application from runtime engines in an ICS runtime, in accordance with an embodiment.

FIG. 5 illustrates a sequence diagram for insulating a web UI application from runtime engines in an ICS runtime, in accordance with an embodiment.

As shown in FIG. 5, when an ICS web UI application 501 can be used to save an ICS project (step 511), a persistence manager 504 can be invoked to create resources (step 512) using a persistence framework API 505. The resource creation can include persist the ICS project files to an underlying database of the persistence framework API.

As further shown in FIG. 5, from the ICS web UI application, a developer can activate (step 515) the ICS project. The project activation can cause an operation manager 506 to create packages (step 514) using the persisted resources retrieved from the persistence store.

In accordance with an embodiment, the operation manager can receive (step 516) the created packages, and invoke a project handler 508 to create a transformed project (step 518). The operation manager can further invoke a runtime deployment bean 509 to deploy the transformed project (step 521).

As described above, a click on a button to activate the ICS project can perform the steps of retrieving the runtime-engine-neutral project, creating project packages (compiling the project), transforming the project into a runtime-engine-specific project, and deploying the transformed project.

In accordance with an embodiment, after the ICS web UI application receives an indication that the ICS project has been successfully deployed (step 525), a monitoring screen can be automatically displayed, wherein requests for runtime metrics (step 526) can be sent to the ICS runtime hosting the deployed project. Runtime metrics can be received (step 527) by the monitoring interface, and displayed in various formats (for example, bar charts).

Figure 6:
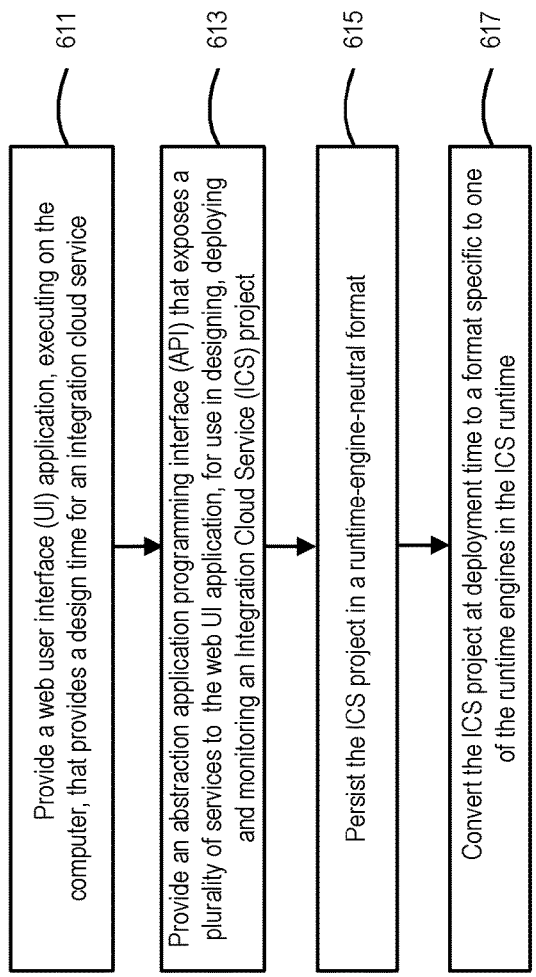
FIG. 6 illustrates a method for insulating a web UI application from runtime engines in an ICS runtime, in accordance with an embodiment.

FIG. 6 illustrates a method for insulating a web UI application from runtime engines in an ICS runtime, in accordance with an embodiment.

As shown in FIG. 6, at step 611, a web UI application is provided on a computer including a microprocessor, wherein the web UI application provides a design time for an ICS.

At step 613, an abstraction application programming interface (API) is provided, the abstraction API exposing a plurality of services to the web UI application, for use in designing, deploying and monitoring an ICS project.

At step 615, the ICS project is persisted in a runtime-engine-neutral format.

At step 616, at deployment time, the ICS project is converted into a format specific to one of the runtime engines in the ICS runtime.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for insulating a web user interface application from runtime engines in a cloud service runtime, the system comprising:
   a computer comprising one or more microprocessors;
   a cloud service, executing on the computer, the cloud service comprising:
      a web interface application for creating an integration flow between a source application and a target application; and
      a runtime for executing the integration flow, the runtime comprising a plurality of runtime engines; and
   an abstraction application programming interface that exposes a plurality of services to the web interface application, for use by the web interface application in designing, deploying and monitoring an integration project,
   wherein the abstraction application programming interface operates to:
      persist the integration project into a persistence store in a runtime-engine-neutral format, wherein the persistence store uses a pluggable persistence framework that insulates the integration project from the plurality of services exposed to the web interface application used by an operation manager to perform create, read, update, and delete operations on the integration project insulated within the persistence store during a development of the integration project with agnostic knowledge by the web interface application of the plurality of runtime engines;
      use a template particular to a first runtime engine of the plurality of runtime engines to transform the integration project developed within the persistence store to a format specific to the first runtime engine of the plurality of runtime engines at deployment time, and
      deploy the integration project transformed to the format specific to the first runtime engine on the first runtime engine for execution.

2. The system of claim 1, wherein the abstraction application programming interface comprises a persistence manager that uses the pluggable persistence framework to persist the integration project.

3. The system of claim 1, wherein the abstraction application programming interface comprises an operation manager that retrieves the runtime-engine-neutral integration project from the persistence store, and invokes a runtime-engine-specific handler to convert the integration project into a runtime-engine-specific format.

4. The system of claim 3, wherein the first runtime engine is selected at deployment time by a user, and wherein the selected first runtime engine is used by the abstraction application programming interface to select the runtime-engine-specific handler.

5. The system of claim 1, wherein the plurality of services exposed by the abstraction application programming interface to the web interface application include an activation service for compiling, transforming and deploying the integration project.

6. The system of claim 1, wherein the format specific to the first runtime engine is a format specific to a service bus runtime engine, or a format specific to a business process execution language (BPEL) runtime engine.

7. The system of claim 1, wherein the runtime-engine-neutral format is defined by the web interface application.

8. A method for insulating a web user interface application from runtime engines in a cloud service runtime, comprising:
   providing an integration cloud service, executing on a computer comprising a microprocessor, the integration cloud service comprising:
      a web interface application for creating an integration flow between a source application and a target application; and
      a runtime for executing the integration flow, the runtime comprising a plurality of runtime engines;
   providing an abstraction application programming interface that exposes a plurality of services to the web interface application, for use by the web interface application in designing, deploying and monitoring an integration project;
   persisting, by the abstraction application programming interface, the integration project into a persistence store in a runtime-engine-neutral format, wherein the persistence store uses a pluggable persistence framework that insulates the integration project from the plurality of services exposed to the web interface application used by an operation manager to perform create, read, update, and delete operations on the integration project insulated within the persistence store during a development of the integration project with agnostic knowledge by the web interface application of the plurality of runtime engines;
   transforming, at deployment time using a template particular to a first runtime engine of the plurality of runtime engines, the integration project developed within the persistence store to a format specific to the first runtime engine of the plurality of runtime engines; and
   deploying the transformed integration project transformed to the format specific to the first runtime engine on the first runtime engine for execution.

9. The method of claim 8, wherein the abstraction application programming interface comprises a persistence manager that uses the pluggable persistence framework to persist the integration project.

10. The method of claim 8, wherein the abstraction application programming interface comprises an operation manager that retrieves the runtime-engine-neutral integration project from the persistence store, and invokes a runtime-engine-specific handler to convert the integration project into a runtime-engine-specific format.

11. The method of claim 10, wherein the first runtime engine is selected at deployment time by a user, and wherein the selected first runtime engine is used by the abstraction application programming interface to select the runtime-engine-specific handler.

12. The method of claim 8, wherein the plurality of services exposed by the abstraction application programming interface to the web interface application include an activation service for compiling, transforming and deploying the integration project.

13. The method of claim 8, wherein the format specific to the first runtime engine is a format specific to a service bus runtime engine, or a format specific to a business process execution language (BPEL) runtime engine.

14. The method of claim 8, wherein the runtime-engine-neutral format is defined by the web interface application.

15. A non-transitory computer-readable storage medium storing a set of instructions for insulating a web interface application from runtime engines in a cloud service runtime, said instructions, when executed by one or more processors, causing the one or more processors to perform steps comprising:
- providing an integration cloud service, executing on a computer comprising a microprocessor, the integration cloud service comprising:
  - a web interface application for creating an integration flow between a source application and a target application and
  - a runtime for executing the integration flow, the runtime comprising a plurality of runtime engines;
- providing an abstraction application programming interface that exposes a plurality of services to the web interface application, for use by the web interface application in designing, deploying and monitoring an integration project;
- persisting, by the abstraction application programming interface, the integration project into a persistence store in a runtime-engine-neutral format, wherein the persistence store uses a pluggable persistence framework that insulates the integration project from the plurality of services exposed to the web interface application used by an operation manager to perform create, read, update, and delete operations on the integration project insulated within the persistence store during a development of the integration project with agnostic knowledge by the web interface application of the plurality of runtime engines;
- transforming, at deployment time using a template particular to a first runtime engine of the plurality of runtime engines, the integration project developed within the persistence store to a format specific to the first runtime engine of the plurality of runtime engines; and
- deploying the transformed integration project transformed to the format specific to the first runtime engine on the first runtime engine for execution.

16. The non-transitory computer-readable storage medium of claim 15, wherein the abstraction application programming interface comprises a persistence manager that uses the pluggable persistence framework to persist the integration project.

17. The non-transitory computer-readable storage medium of claim 15, wherein the abstraction application programming interface comprises an operation manager that retrieves the runtime-engine-neutral integration project from the persistence store, and invokes a runtime-engine-specific handler to convert the integration project into a runtime-engine-specific format.

18. The non-transitory computer-readable storage medium of claim 17, wherein the first runtime engine is selected at deployment time by a user, and wherein the selected first runtime engine is used by the abstraction application programming interface to select the runtime-engine-specific handler.

19. The non-transitory computer-readable storage medium of claim 15, wherein the plurality of services exposed by the abstraction application programming interface to the web interface application include an activation service for compiling, transforming and deploying the integration project.

20. The non-transitory computer-readable storage medium of claim 15, wherein the format specific to the first runtime engine is a format specific to a service bus runtime engine, or a format specific to a business process execution language (BPEL) runtime engine.

* * * * *

UNITED STATES PATENT AND TRADEMARK OFFICE
CERTIFICATE OF CORRECTION

| | |
|---|---|
| PATENT NO. | : 10,216,504 B2 |
| APPLICATION NO. | : 15/171908 |
| DATED | : February 26, 2019 |
| INVENTOR(S) | : Allgeier et al. |

Page 1 of 1

It is certified that error appears in the above-identified patent and that said Letters Patent is hereby corrected as shown below:

In the Specification

In Column 2, Line 59, delete "metada," and insert -- metadata, --, therefor.

Signed and Sealed this
Fourth Day of February, 2020

Andrei Iancu
*Director of the United States Patent and Trademark Office*